(12) United States Patent
Goto

(10) Patent No.: US 7,686,463 B2
(45) Date of Patent: *Mar. 30, 2010

(54) VIEWING-ANGLE CONTROL SHEET

(75) Inventor: Masahiro Goto, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/562,516

(22) PCT Filed: Apr. 26, 2005

(86) PCT No.: PCT/JP2005/007911

§ 371 (c)(1),
(2), (4) Date: Dec. 28, 2005

(87) PCT Pub. No.: WO2005/116698

PCT Pub. Date: Dec. 8, 2005

(65) Prior Publication Data

US 2006/0245060 A1 Nov. 2, 2006

(30) Foreign Application Priority Data

May 25, 2004 (JP) .............................. 2004-154911

(51) Int. Cl.
*G02B 27/00* (2006.01)
*G03B 21/56* (2006.01)
(52) U.S. Cl. ........................ 359/613; 359/456; 359/614
(58) Field of Classification Search ......... 359/601–615, 359/450–457

See application file for complete search history.

(56) References Cited

U.S. PATENT DOCUMENTS

| 4,573,764 A * | 3/1986 | Bradley ....................... 359/453 |
| 4,621,898 A * | 11/1986 | Cohen ......................... 359/601 |
| 6,700,716 B2 * | 3/2004 | Sejkora ....................... 359/834 |
| 6,822,792 B2 * | 11/2004 | Goto ........................... 359/456 |
| 2007/0153377 A1 * | 7/2007 | Goto ........................... 359/460 |

FOREIGN PATENT DOCUMENTS

| JP | 8-335044 | 12/1996 |
| JP | 2000-180612 | 6/2000 |
| JP | 2003-50307 | 2/2003 |
| JP | 2003-57416 | 2/2003 |
| JP | 2003-66206 | 3/2003 |
| JP | 2004-12918 | 1/2004 |
| JP | 2004-110002 | 4/2004 |
| JP | 2005-181691 | 7/2005 |

OTHER PUBLICATIONS

English translation of the Japanese reference No. 2003-66206.*

* cited by examiner

*Primary Examiner*—Thong Nguyen
(74) *Attorney, Agent, or Firm*—Ladas & Parry LLP

(57) ABSTRACT

A view angle control sheet which can suppress a decrease in screen brightness is provided. Lens portions having trapezoidal shapes in cross section are arranged at predetermined intervals, and a wedge-shaped portion between the lens portions adjacent to each other is filled with the same material as the lens portion or with a material different from the lens portion. In the wedge-shaped portion, a bottom surface is provided on a screen image side while a leading edge is provided on an observer side, and at least a slope portion of the wedge-shaped portion is made of a material having a refractive index lower than that of a lens portion material.

12 Claims, 15 Drawing Sheets (SCREEN IMAGE SIDE) (OBSERVER SIDE)

(SCREEN IMAGE SIDE) (OBSERVER SIDE)

(SCREEN IMAGE SIDE) (OBSERVER SIDE)

S11

(SCREEN IMAGE SIDE)                    (OBSERVER SIDE)

(SCREEN IMAGE SIDE)     (OBSERVER SIDE)

VIEWING-ANGLE CONTROL SHEET

BACKGROUND OF THE INVENTION

1. Technical Field

The present invention relates to a view angle control sheet which is suitably used for display devices such as an organic light emitting diode (hereinafter referred to as an "OLED") display and a liquid crystal display (hereinafter referred to as an "LCD").

2. Background Art

Usually it is preferable that an OLED display, an LCD, and the like have a wide view angle such that a good image is obtained when an observer sees the image from any position. For example, Patent Document 1 discloses a light diffusion sheet, in which plural unit lenses are formed in a one-dimensional direction or a two-dimensional direction, the unit lens includes a total reflection portion where total reflection of a part of an incident light beam is generated in an inner plane of the total reflection portion, the unit lens is made of a material having a predetermined refractive index N1, and a portion located between the adjacent unit lenses is filled with a material having a predetermined refractive index N2.

On the other hand, for example, when a person performs work in a commuter train, sometimes the person needs to prevent other people from taking a look inside a screen. In such cases, it is desirable that the view angle be controlled such that the screen can be seen only from the observer of the display while the screen cannot be seen from other people. In order to meet such the demand, for example, a louver type view angle control sheet is developed and used as shown in FIG. 15.

Patent Document 1: Japanese Patent Application Laid-Open No. 2003-50307

SUMMARY OF THE INVENTION

Problem to be Solved by the Invention

In the louver type view angle control sheet there is a problem that screen brightness is decreased because screen image light in an oblique direction is simply cut.

In view of the foregoing, an object of the invention is to provide a view angle control sheet that can control the decrease in screen brightness.

Means for Solving the Problem

The invention will be described below.

In the invention, the problem of decreased of screen brightness is solved by a view angle control sheet that has lens portions having trapezoidal shapes in cross section arranged at predetermined intervals. A wedge-shaped portion between the lens portions adjacent to each other is filled with the same material as the lens portion or with a material different from the lens portion. The wedge-shaped portion has a bottom surface on a screen image side while having a leading edge on an observer side, and the following relationship is maintained at least between a refractive index $N2$ of a material constituting a slope portion of the wedge-shaped portion and a refractive index $N1$ of a material constituting the lens portion: $N2 \leq N1$.

The view angle control sheet as described above, further has an angle θ (degree) formed by the slope portion and a normal line of a light beam outgoing plane that exists in the following range:

$3 \leq \theta \leq 20$.

When the above-mentioned relationship occurs, the following relationship is maintained between the refractive indexes $N1$ and $N2$:

$0.8 N1 \leq N2 \leq 0.98 N1$.

The view angle control sheet can also have the following relationship between the refractive indexes $N1$ and $N2$:

$N1 - 0.01 \leq N2$.

When the previous relationship occurs and the ratio of the refractive indexes $N1$ and $N2$ is $N2/N1 = R$, the following relationship is maintained in the angle θ (degree) formed by the slope portion of the wedge-shaped portion and the normal line of the light beam outgoing plane:

$-0.01 < R - \cos\theta < 0.002$.

A cross-sectional shape of the wedge-shaped portion is a substantial isosceles triangle.

Further, one of the angles formed by two slopes of the wedge-shaped portion and the normal line of the light beam outgoing plane is larger than the other.

Moreover, the slope portion has a curved cross-sectional shape and/or a polygonal-line cross-sectional shape such that the screen image side differs from the observer side in an angle formed by the slope portion and an observer side surface.

Additionally, the wedge-shaped portion has a light beam absorption effect.

Accordingly, the light beam absorption particles are added to the wedge-shaped portion.

An average particle size of the light beam absorption particles is at least 1 μm and the average particle size is not more than two-thirds of a width of the bottom surface.

Therefore, the addition amount of the light beam absorption particle ranges from 10 to 50% by volume.

A function of any one of anti-reflection (AR), anti-static (AS), anti-glaring (AG), and a touch sensor or plurality functions thereof are imparted to at least one surface side.

Additionally, the invention describes a display device wherein the view angle control sheet is bonded.

The view angle control sheet of the display device is arranged in a crosswise stripe.

The view angle control sheet of the display device is laminated on the observer side of a screen image source or two view angle control sheets are laminated on the observer side of the screen image source while being substantially orthogonal to each other.

The width of the bottom surface of the display device is not more than 1/1.5 of a size of one pixel.

Effect of the Invention

According to the invention, the view angle control sheet that can suppress the decrease in brightness can be obtained. Further, according to the view angle control sheet of the invention, image contrast can be improved. These features and advantages of the invention will be apparent from the following best mode for carrying out the invention.

BRIEF DESCRIPTION OF THE DRAWING FIGURES

Figure 9A:
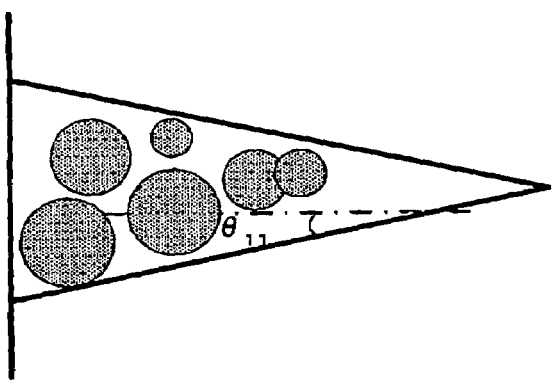
Figure 9B:
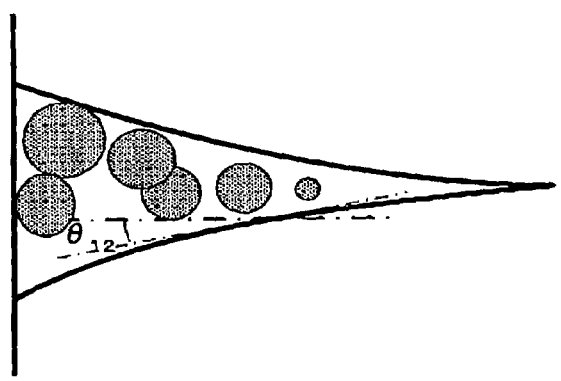
Figure 9C:
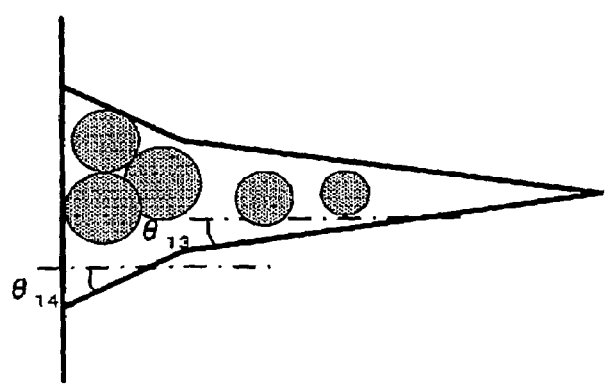
Figure 10:
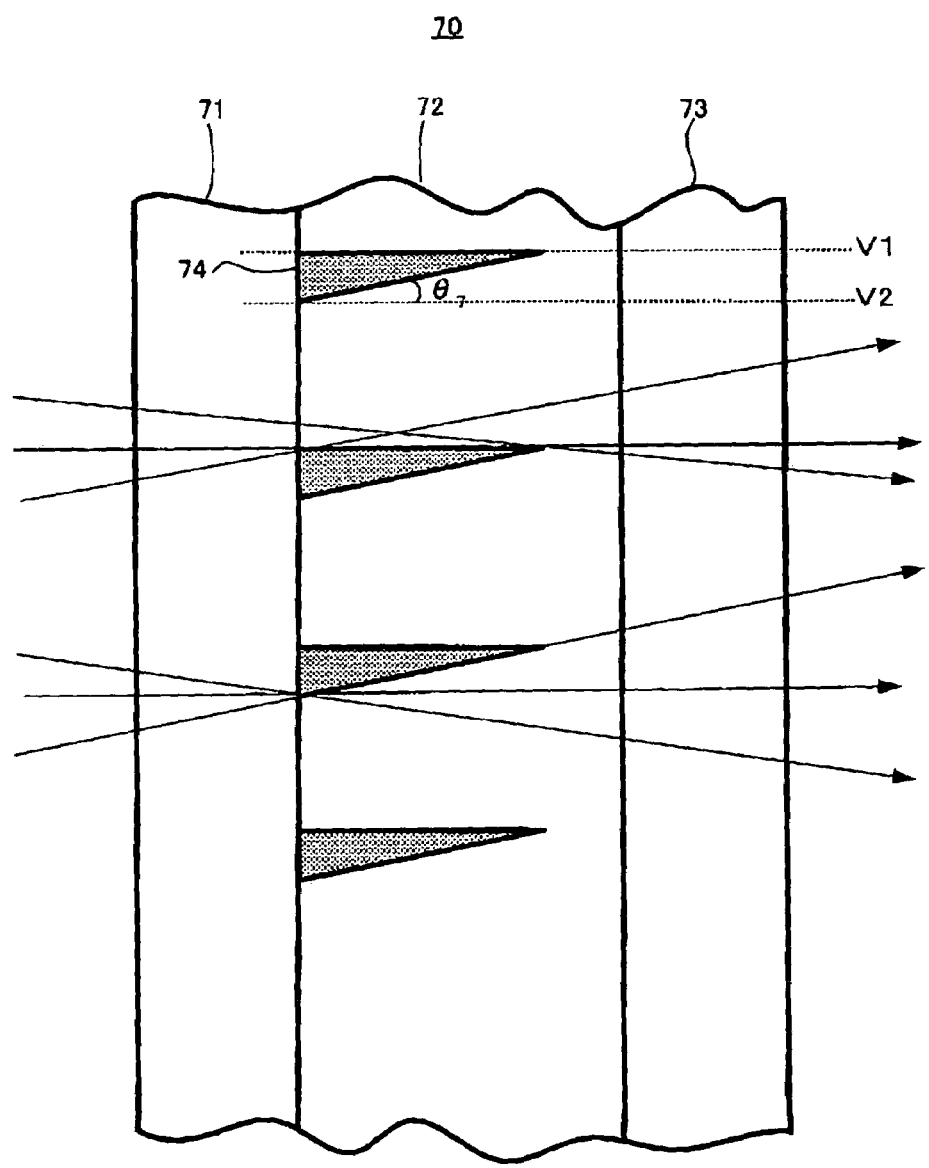
Figure 11:
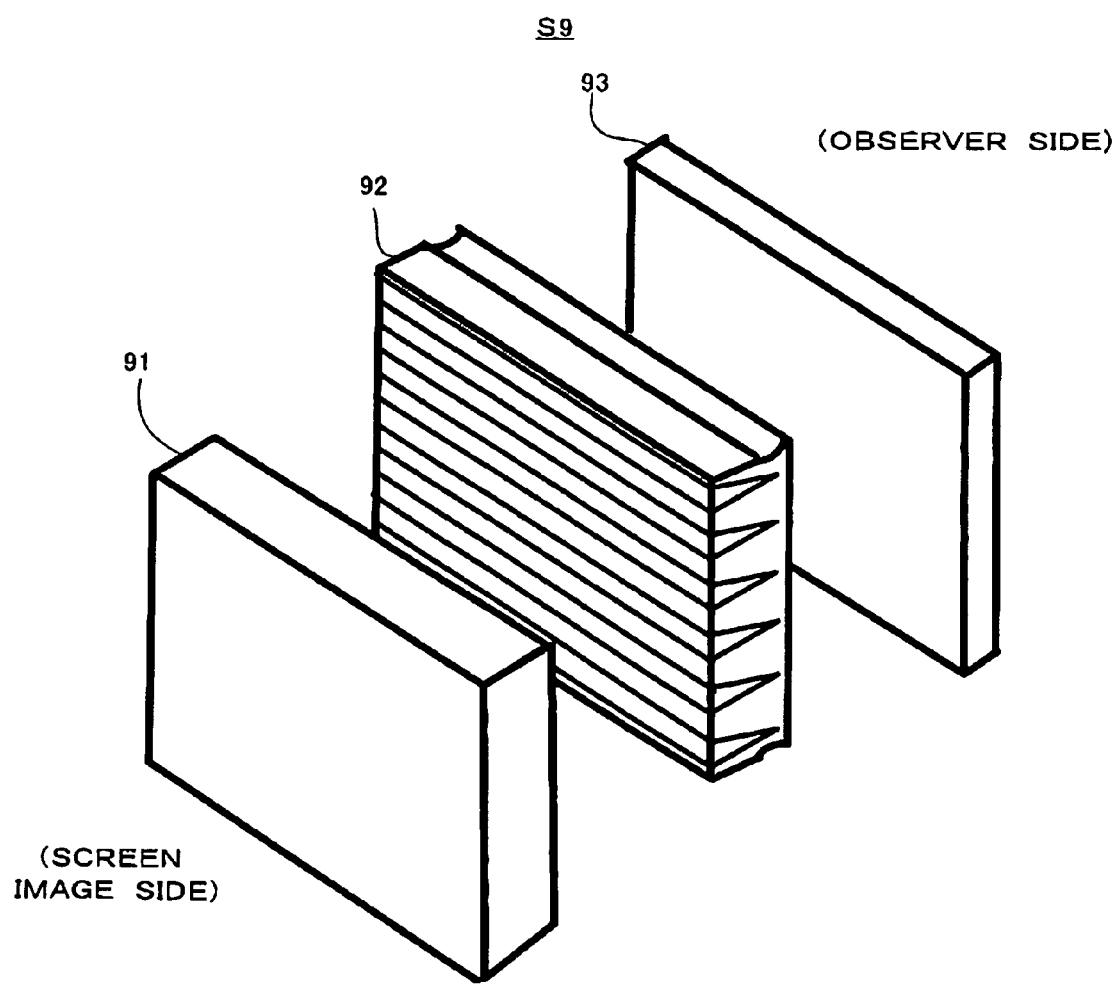
Figure 12:
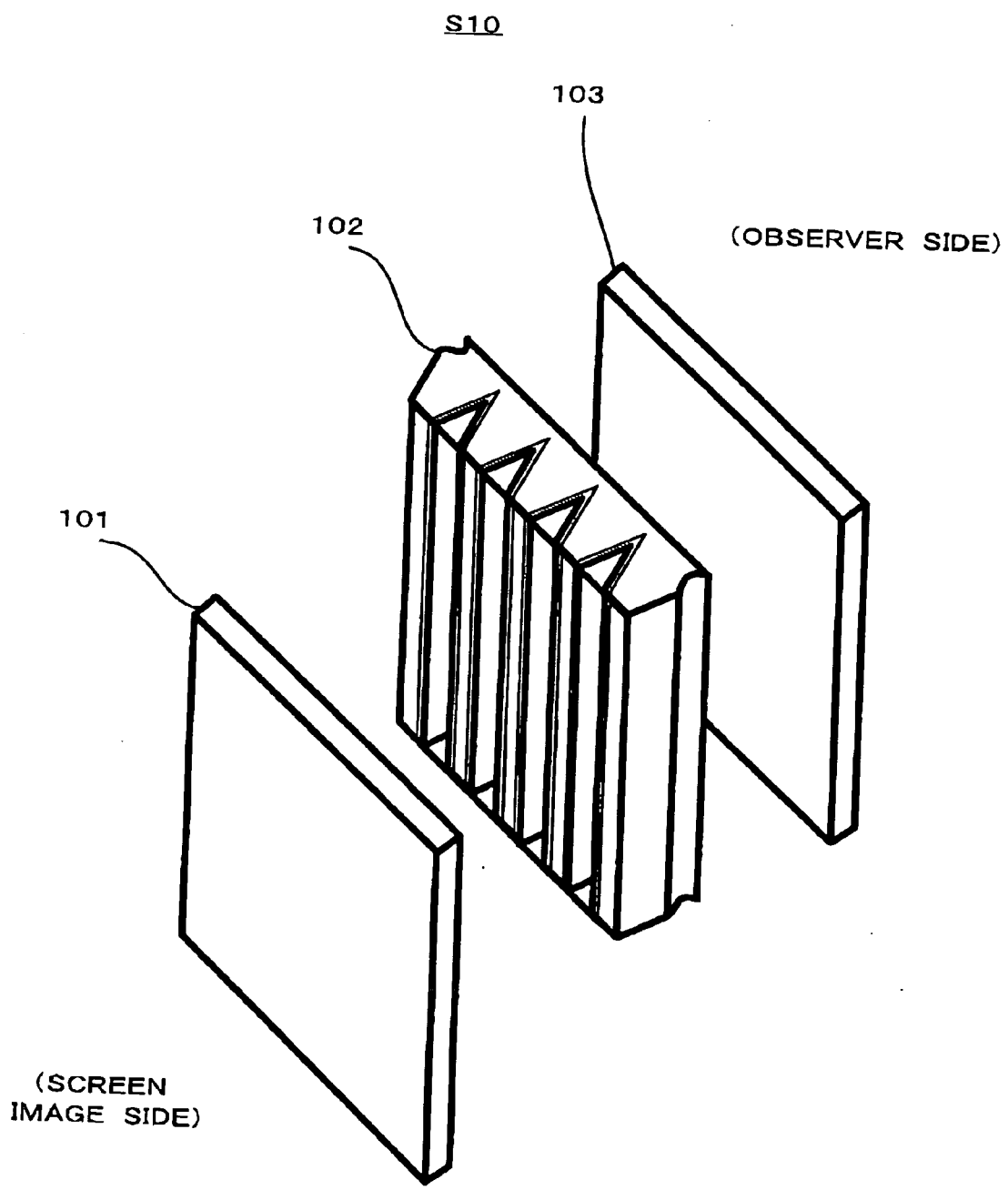
Figure 13:
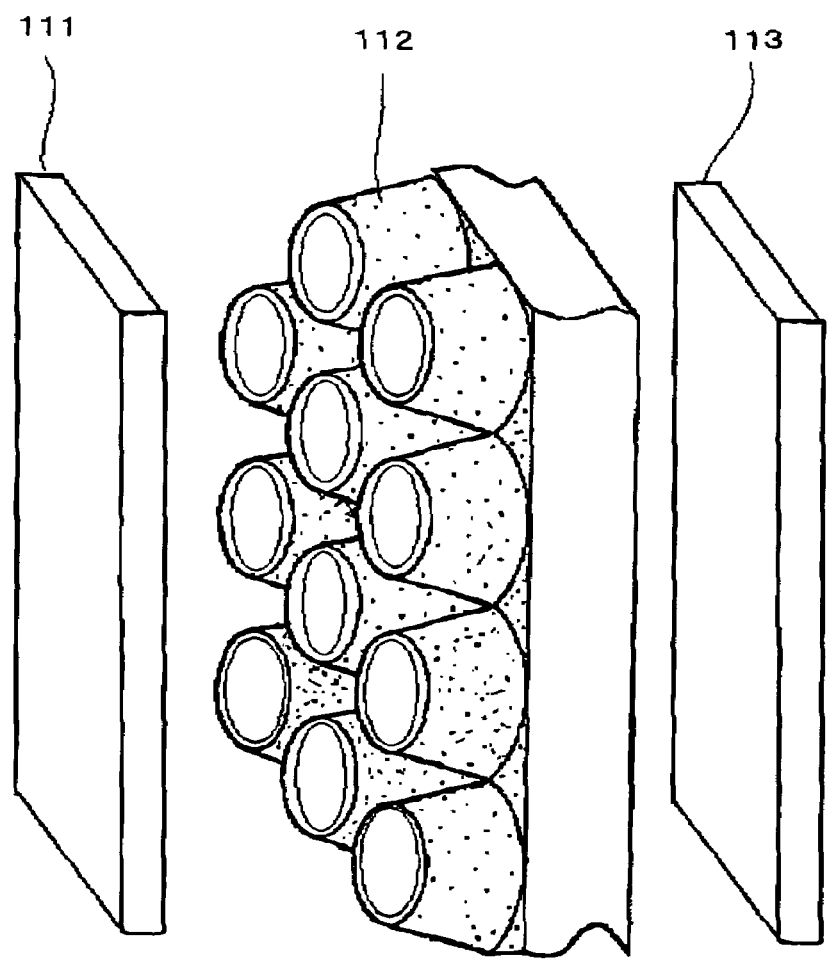
Figure 14:
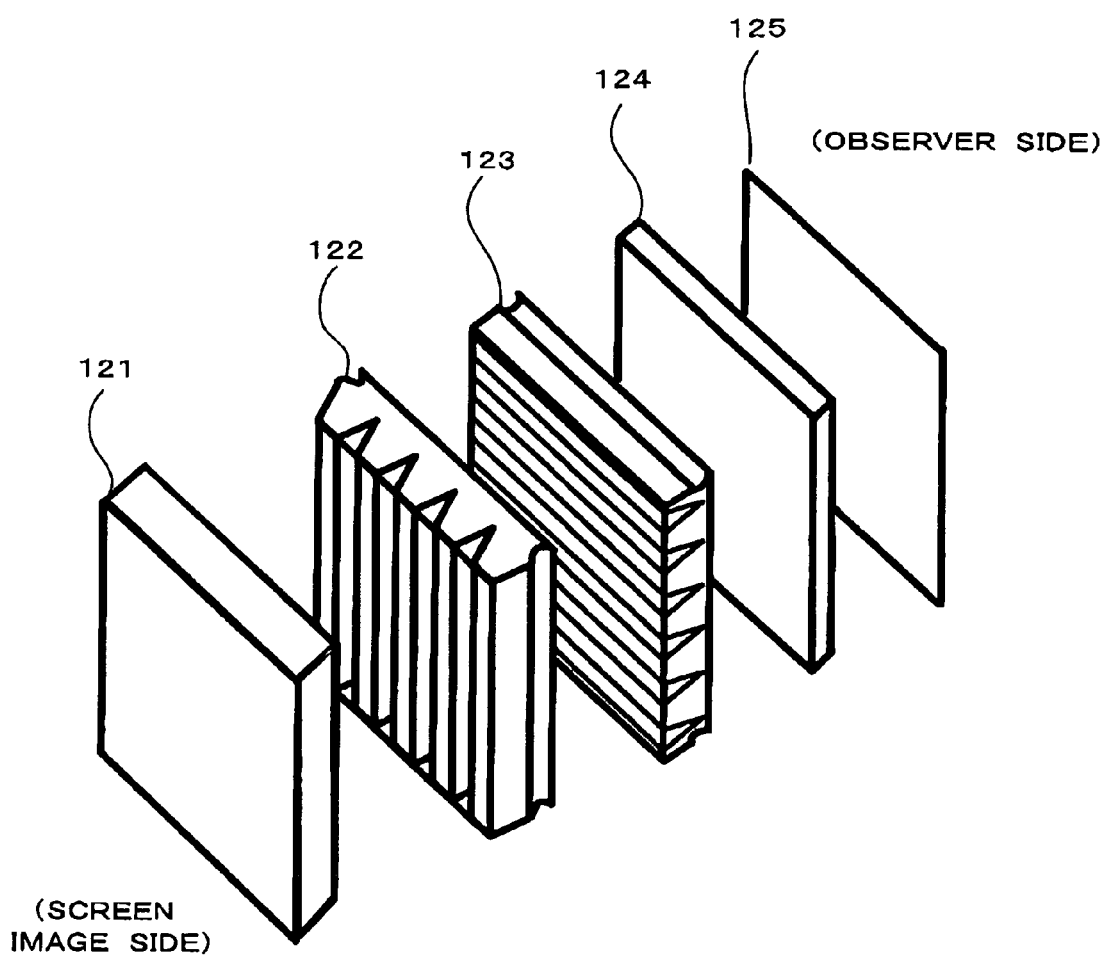
Figure 15:
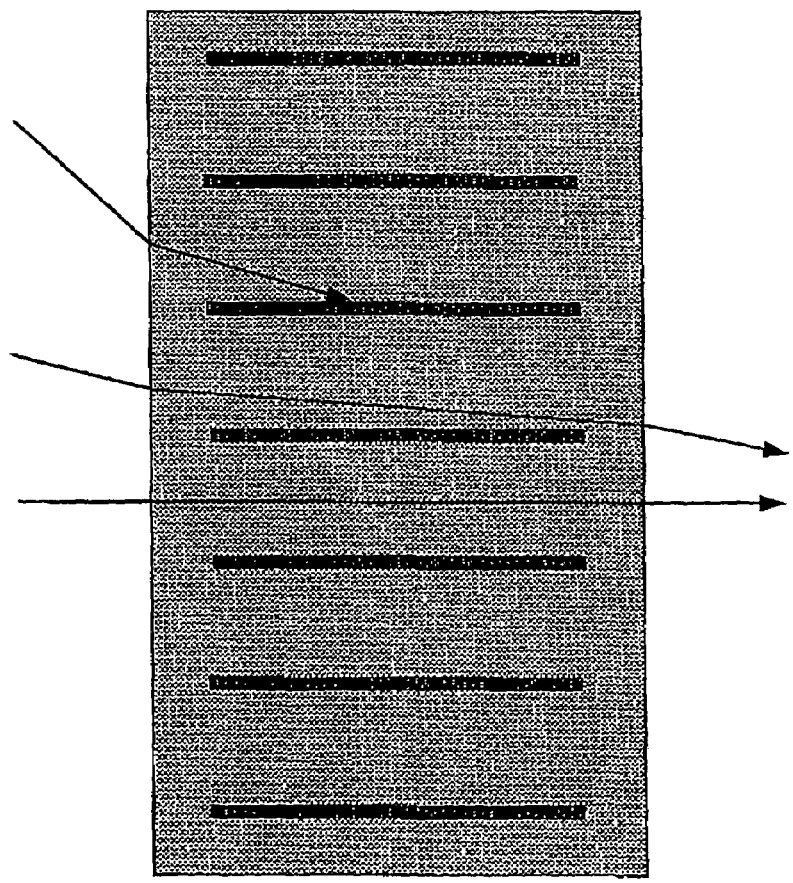

FIGS. 9A-C show various shape modes of a low-refractive index portion;

FIG. 10 is a view showing the cross section of the view angle control sheet in which a slope shape of the wedge-shaped portion exhibits another mode;

FIG. 11 is a view showing an example of a configuration of the view angle control sheet;

FIG. 12 is a view showing another example of the configuration of the view angle control sheet;

FIG. 13 is a view showing still another example of a configuration of the view angle control sheet;

FIG. 14 is a view showing an example of the configuration of a display device provided with the view angle control sheet; and FIG. 15 is a view showing an example of the conventional view angle restriction sheet.

DESCRIPTION OF THE REFERENCE NUMERALS AND SIGNS

S1, S2, S3, S4, S5, S9, S10, and S11 view angle control sheet
11, 21, 31, 41, 51, 61, 71, and 91 screen image-side base sheet
12, 22, 32, 42, 52, 62, 72, and 92 lens portion
13, 23, 33, 43, 53, 63, 73, and 93 observer-side base sheet
14, 24, 34, 44, and 54 wedge-shaped portion
35 and 55 inter-lens portion
17, 27, 37, 47, and 57 bottom surface
120 display device
L11, L12, L13, L21, L22, L23, L31, L32, L33, L41, L42, L43, L51, L52, and L53 light beam
L14, L24, L34, L44, and L54 light incident to bottom surface
L15, L25, L37, L45, and L55 outside light beam

DETAILED DESCRIPTION OF THE PREFERRED EMBODIMENTS

The invention will be described below based on preferred embodiments shown in the drawings.

Figure 1:
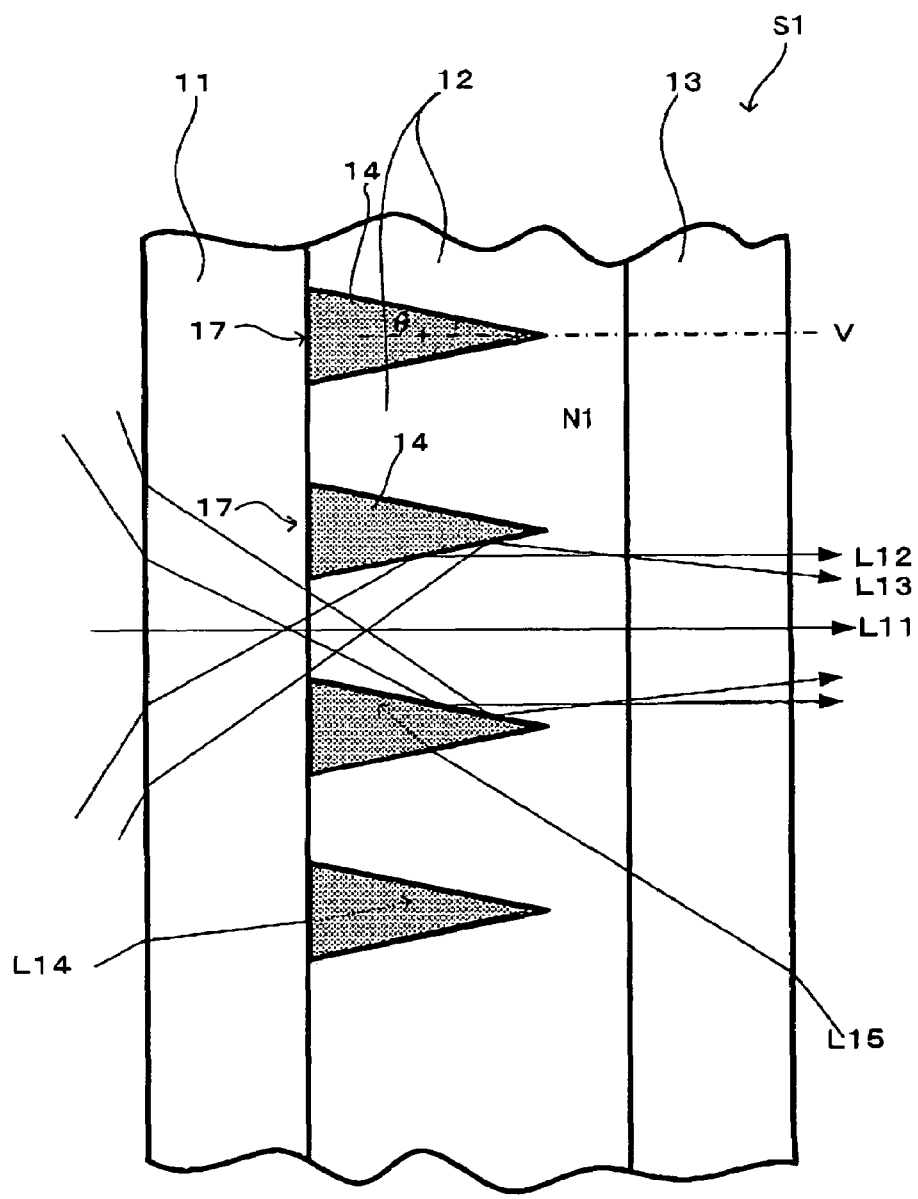
FIG. 1 is a view showing a cross section in a direction of a view angle control sheet according to a first embodiment of the invention.

FIG. 1 is a view showing a cross section in a direction of a view angle control sheet S1 according to a first embodiment of the invention. In FIG. 1, a screen image light source is arranged on the left side in the drawing, and an observer lies on the right side in the drawing. The view angle control sheet S1 is formed by gluing a screen image-side base sheet 11, a lens portion 12, and an observer-side base sheet 13 in order from the screen image side to the observer side. The lens portion 12 is made of a material whose refractive index is N1. In FIG. 1, a portion having a triangular shape in cross section sandwiched by hypotenuses of the lens portions 12 and 12 vertically adjacent to each other is filled with a material having the refractive index N2 lower than the refractive index N1 of the lens portion 12. Hereinafter the portion filled with the low-refractive index material is referred to as "wedge-shaped portion 14". The wedge-shaped portion 14 has a leading edge on the observer side, and the wedge-shaped portion 14 has a bottom surface 17 on the screen image side.

A ratio of the refractive index N1 of the lens portion 12 to the refractive index N2 of the wedge-shaped portion 14 is set in a predetermined range in order to secure optical characteristics of the view angle control sheet S1. An angle formed by the hypotenuse where the wedge-shaped portion 14 and the lens portion 12 are in contact with each other and a normal line V (line parallel to a normal-incidence light beam to the view angle control sheet S1) of an outgoing light beam plane is formed at a predetermined angle $\theta_1$.

In the invention, the angle $\theta_1$ is set in the range of 3 to 20 degrees in order to totally reflect the screen image light beam at the slope portion of the wedge-shaped portion to narrow the view angle. In the angle setting of the total reflection plane, an optimum value depends on a distance between an imaging surface and the view angle control sheet, resolution of the image screen, necessary view angle brightness, and the like. In order to suppress the decrease in resolution caused by ghost generation or the like, it is necessary that positional displacement between the totally reflected screen image and the directly transmitted screen image be decreased by setting angle $\theta_1$ in the range of about 3 to about 5 degrees. Because the decrease in resolution caused by the ghost generation or the like becomes remarkable when the distance between the imaging surface and the sheet is broadened, similarly it is necessary to decrease the angle $\theta_1$. On the contrary, it is thought that the angle $\theta_1$ ranging from about 5 to about 20 degrees is also required in order to sufficiently exert brightness increase effect. Thus, it is necessary that the optimum value is determined as the angle $\theta_1$ by performing design in appropriate consideration of the view angle and the distance between the imaging surface and the view angle control sheet. With reference to a refractive index difference, similarly the refractive index difference is increased in order to obtain the brightness increase effect in the wide range. On the other hand, when the decrease in resolution caused by the ghost is suppressed rather than obtaining the brightness increase effect only near a front face, it is necessary to decrease the refractive index difference. That is, in the broad distance between the imaging surface and the view angle control sheet, in the case of emphasis on the resolution, it is advantageous that the angle $\theta_1$ is decreased while the refractive index difference is decreased. On the other hand, in the narrow distance between the imaging surface and the view angle control sheet, in order to obtain the brightness increase effect in the wide range, it is advantageous that the angle $\theta_1$ is increased while the refractive index difference is increased.

In consideration of all the above things, usually the angle $\theta_1$ is set in the range of 3 to 20 degrees. When the angle $\theta_1$ exceeds 20 degrees, the sufficient brightness increase effect is decreased in the front face and only the decrease in resolution becomes remarkable. The ghost is also easily generated. When the angle $\theta_1$ is set lower than 3 degrees, because the diffusion light beams do not reach the observer-side front face, the brightness increase effect is not obtained. From the viewpoint of difficulty of die production, in the range in which the production can stably be performed, it is preferable that the angle $\theta_1$ be at least 5 degrees. When the angle $\theta_1$ is set near the range of 3 to 5 degrees, an aperture ratio can be increased to improve the contrast. However, the effect that the brightness at zero degree is improved is weakened because the angle $\theta_1$ focuses the diffusion light beams near zero degree. That is, when the angle $\theta_1$ ranges from 3 to 5 degrees, the brightness increase effect is slightly decreased because the focus effect is decreased, and the ghost is hardly generated due to the influence of the decrease in brightness increase effect. Since the aperture can be increased even if the angle $\theta_1$ is decreased to the level of the range of 3 to 5 degrees, the front-face brightness is decreased only slightly. However, from the viewpoints of die production and difficulty of lens molding, it is further preferable that the angle $\theta_1$ be at least 5 degrees. The description of the angle $\theta_1$ in the first embodiment shall also hold in the following angles $\theta_2$ to $\theta_6$. In the embodiments of the description including the first embodiment, the wedge-shaped portion has the triangular cross-sectional shape. The invention is not limited to the embodiment. For example, the cross-sectional shape of the wedge-shaped portion may be formed in a trapezoid.

The wedge-shaped portion 14 is colored in predetermined density with pigment such as carbon or with predetermined dye. The screen image-side base sheet 11 and the observer-side base sheet 13 are made of the material whose refractive index is substantially similar to the refractive index of the lens portion 12. An outside surface of the observer-side base sheet 13 has a function of at least one of AR, AS, and AG on the observer side. "AR" is the abbreviation of anti-reflection, and the "AR" shall mean the function of suppressing reflectance of the light beam incident to the lens surface. "AS" is the abbreviation of anti-static, and the "AS" shall mean the anti-static function. "AG" is the abbreviation of anti-glare, and the "AG" shall mean the anti-glaring function of the lens. The view angle control sheet S1 according to the first embodiment may have only one of these functions, or the view angle control sheet S1 may have the plural functions.

An optical path of the light beam incident to the lens portion 12 of the view angle control sheet S1 will briefly be described with reference to FIG. 1. The optical paths of the light beams L11 to L15 are schematically shown in FIG. 1. The normal light beam L11 incident near a center portion of the lens portion 12 from the screen image light source side goes straight in and passes through the view angle control sheet S1 to reach the observer. The light beam L12 incident near an end portion of the lens portion 12 from the screen image light source side with a predetermined angle is totally reflected at the hypotenuse due to the refractive index difference between the refractive index N1 of the lens portion 12 and the refractive index N2 of the wedge-shaped portion 14, and the light beam L12 is output onto the observer side as the normal light beam. The light beam L13 incident near the end portion of the lens portion 12 from the screen image light source side with the large angle is totally reflected at the hypotenuse, and the light beam L13 is output onto the observer side with the small angle close to the normal light beam unlike the incident light beam in the opposite direction of the incident light beam. The light beam L14 which directly impinges on the wedge-shaped portion 14 from the bottom surface 17 is incident to the inside of the wedge-shaped portion 14. Since the wedge-shaped portion 14 is colored, the light beam L14 is absorbed by the wedge-shaped portion 14 and the light beam L14 never reaches the observer side. The outside light beam L15 incident to the hypotenuse from the observer side with the angle larger than the predetermined angle is not totally reflected irrespective of the refractive index difference between the lens portion 12 and the wedge-shaped portion 14, and the outside light beam L15 is incident to the inside of the wedge-shaped portion 14. The outside light beam L15 is absorbed by the colored wedge-shaped portion 14. Accordingly, the image contrast is improved in a visual field from the observer side. Thus, the view angle can be controlled in the cross-sectional direction and the decrease in brightness can be suppressed, so that the high-contrast view angle control sheet can be obtained.

Figure 2:
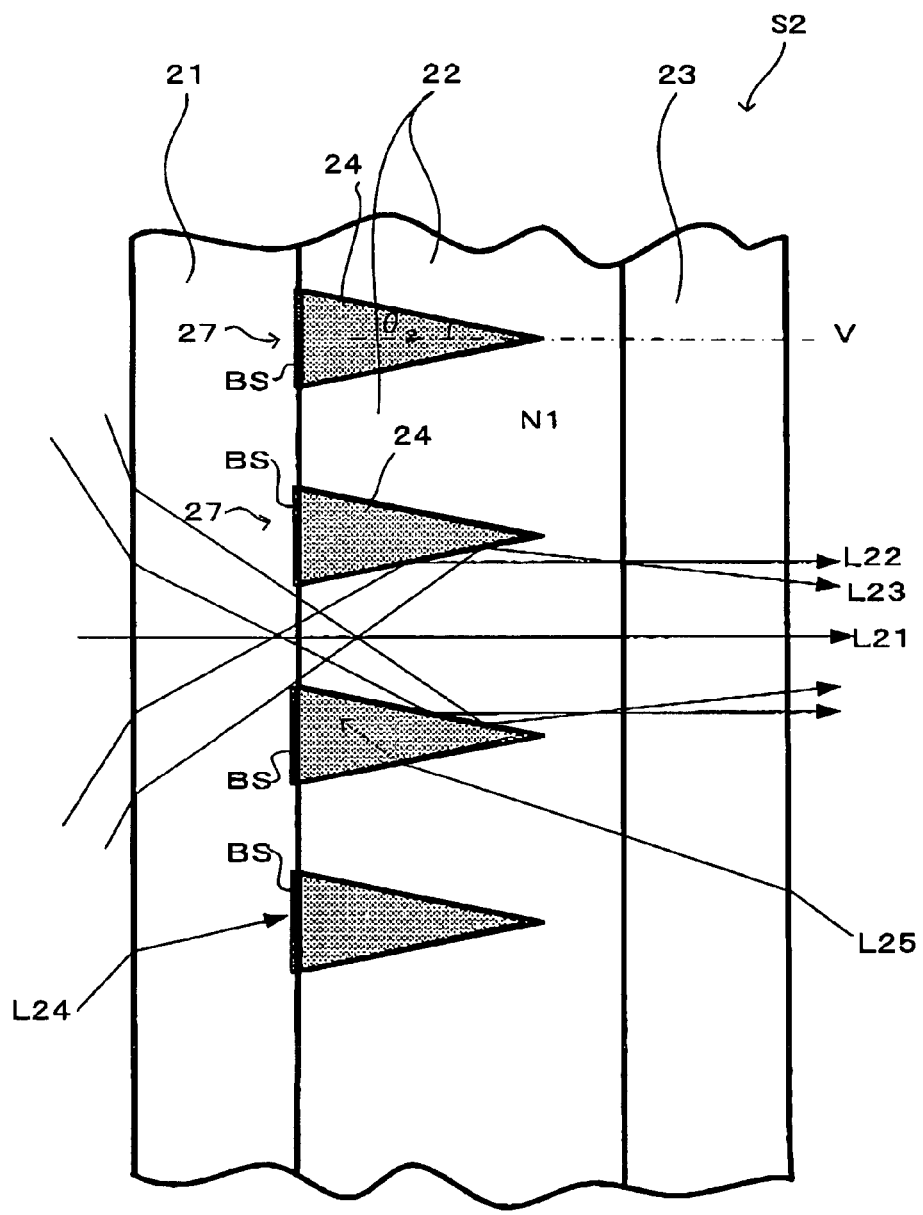
FIG. 2 is a view showing a cross section in a direction of a view angle control sheet according to a second embodiment of the invention.

FIG. 2 is a view showing a cross section in a direction of a view angle control sheet S2 according to a second embodiment. In FIG. 2, similarly the screen image light source is arranged on the left side in the drawing, and the observer lies on the right side in the drawing. The view angle control sheet S2 is formed by gluing a screen image-side base sheet 21, a lens portion 22, and an observer-side base sheet 23 in order from the screen image side to the observer side. The lens portion 22 is made of the material whose refractive index is N1. In FIG. 2, a portion having the triangular shape in cross section sandwiched by the hypotenuses of the lens portions 22 and 22 vertically adjacent to each other is filled with the material having the refractive index N2 lower than the refractive index N1 of the lens portion 22. Hereinafter the portion filled with the low-refractive index material is referred to as "wedge-shaped portion 24". The wedge-shaped portion 24 has the leading edge on the observer side, and the wedge-shaped portion 24 has a bottom surface 27 on the screen image side.

A ratio of the refractive index N1 of the lens portion 22 to the refractive index N2 of the wedge-shaped portion 24 is set in the predetermined range in order to secure the optical characteristics of the view angle control sheet S2. An angle formed by the hypotenuse where the wedge-shaped portion 24 and the lens portion 22 are in contact with each other and the normal line V (line parallel to the normal-incidence light beam relative to the view angle control sheet S2) of the outgoing light beam plane is formed at a predetermined angle $\theta_2$.

The wedge-shaped portion 24 is colored in the predetermined density with the pigment such as carbon or with the predetermined dye. The screen image-side base sheet 21 and the observer-side base sheet 23 are made of the material whose refractive index is substantially similar to the refractive index of the lens portion 22. The outside surface of the observer-side base sheet 23 has the function of at least one of AR, AS, and AG on the observer side. In the second embodiment, the view angle control sheet S2 may have only one of these functions, or the view angle control sheet S2 may have the plural functions.

In the view angle control sheet S2 shown in FIG. 2, when the lens portions 22 are arranged in the one-dimensional direction, a black stripe BS is formed in the bottom surface 27 (many circular black faces are formed when the lens portions 22 are arranged in the two-dimensional direction). The inside of the wedge-shaped portion 24 is filled with the material having the refractive index N2 lower than the refractive index N1 of the lens portion 22. In the view angle control sheet S2 having the above-described configuration, light beams L21 to L23 incident from the screen image light source side pass through the same optical paths as the incident light beams L11 to L13 in the view angle control sheet S1 according to the first embodiment. A light beam L24 incident to the black stripe BS of the bottom surface 27 is absorbed by the black stripe BS. Further, an outside light beam L25 incident to the hypotenuse from the observer side with the angle larger than the predetermined angle is not totally reflected irrespective of the refractive index difference between the lens portion 22 and the wedge-shaped portion 24, and the outside light beam L25 is incident to the inside of the wedge-shaped portion 24. The outside light beam L25 is absorbed by the colored wedge-shaped portion 24. Accordingly, the image contrast is improved in the visual field from the observer side. Thus, the view angle control sheet S2 can obtain the same effect as the view angle control sheet S1 according to the first embodiment. That is, the view angle can be controlled in the cross-sectional direction and the decrease in brightness can be suppressed, so that the high-contrast view angle control sheet can be obtained.

Figure 3:
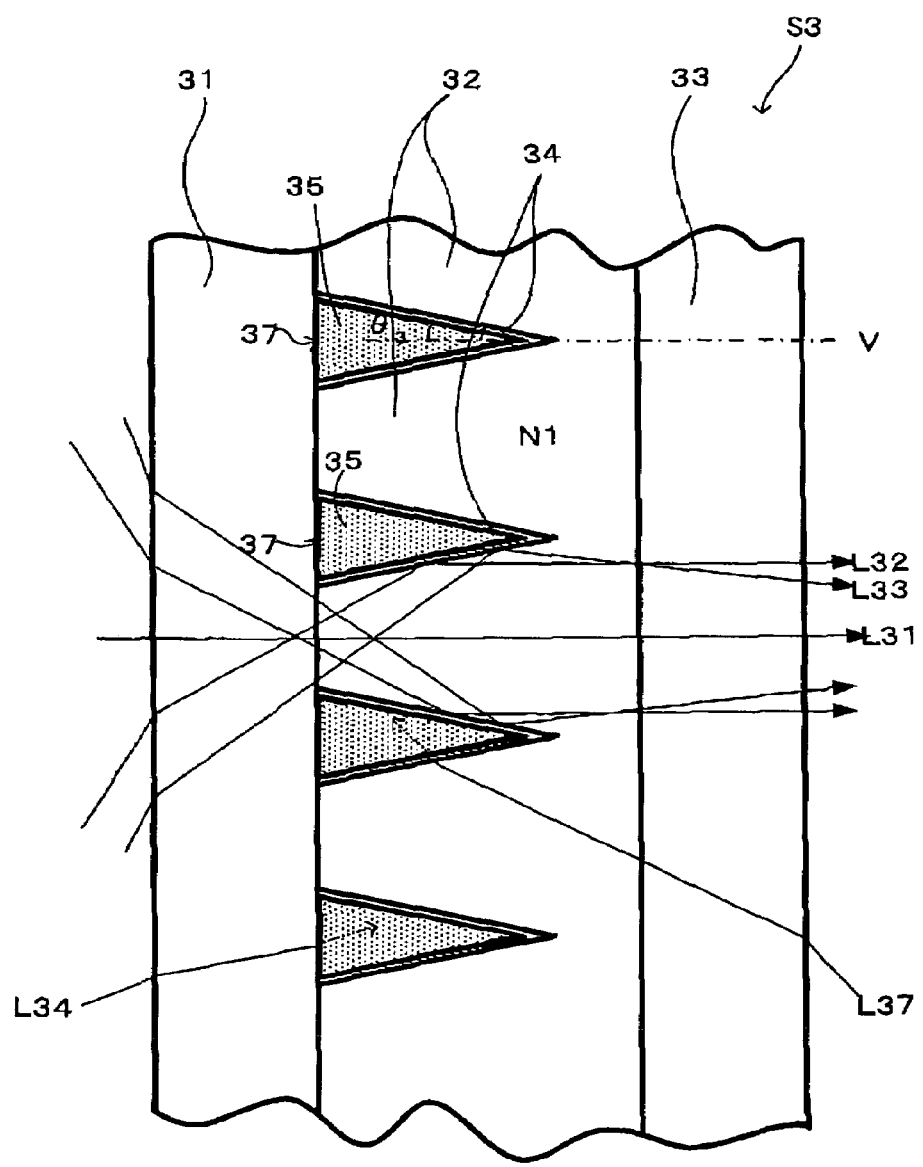
FIG. 3 is a view showing a cross section in a direction of a view angle control sheet according to a third embodiment of the invention.

FIG. 3 shows a view angle control sheet S3 according to a third embodiment of the invention. The view angle control sheet S3 is arranged by gluing a screen image-side base sheet 31, a lens portion 32, and an observer-side base sheet 33 in order from the screen image side to the observer side. The lens portion 32 is made of the material having the high refractive index N1. Moreover, in FIG. 3, a layer 34 (hereinafter referred to as "transparent low-refractive index layer 34") is formed in the hypotenuses of the lens portions 32 and 32 vertically adjacent to each other. The transparent low-refractive index layer 34 is made of the transparent material having the refractive index N2 lower than the refractive index N1. A portion having the triangular shape in cross section sandwiched by the hypotenuses of the adjacent lens portions 32 and 32 is filled with the material having the substantially same refractive index as the refractive index N1 of the lens portion 32. Hereinafter sometimes the portion having the triangular shape in cross section is referred to as "inter-lens portion 35".

A ratio of the refractive index N1 of the lens portion 32 to the refractive index N2 of the transparent low-refractive index layer 34 is set in the predetermined range in order to secure the optical characteristics of the view angle control sheet S3. An angle formed by the hypotenuse where the transparent low-refractive index layer 34 and the lens portion 32 are in contact with each other and the normal line V (line parallel to the normal-incidence light beam relative to the view angle control sheet S3) of the outgoing light beam plane is formed at a predetermined angle $\theta_3$. The ratio and the angle $\theta_3$ will be described in detail later.

The lens portion 32 is usually made of the material such as epoxy acrylate having an ionizing radiation-curable property. The transparent low-refractive index layer 34 is made of the material having the refractive index lower than the refractive index of a transparent resin such as silica. In addition, the inter-lens portion 35 is colored in the predetermined density with carbon, the pigment or with the predetermined dye. The screen image-side base sheet 31 and the observer-side base sheet 33 are made of the material whose refractive index is substantially similar to the refractive index of the lens portion 32. Similarly to the view angle control sheet S1 according to the first embodiment, the outside surface of the observer-side base sheet 33 has the function of at least one of AR, AS, and AG on the observer side.

In the view angle control sheet S3 having the above-described configuration, light beams L31 to L33 incident from the screen image light source side pass through the same optical paths as the incident light beams L11 to L13 in the view angle control sheet S1 according to the first embodiment. A light beam L34 which impinges on a bottom surface 37 of the colored inter-lens portion 35 is incident to the inside of the colored inter-lens portion 35, and the light beam L34 is absorbed by the colored inter-lens portion 35 and the light beam L34 never reaches the observer side. Further, an outside light beam L37 incident to the hypotenuse from the observer side with the angle larger than the predetermined angle is not totally reflected irrespective of the refractive index difference between the lens portion 32 and the transparent low-refractive index layer 34, the outside light beam L37 is transmitted through the transparent low-refractive index layer 34. Then, the outside light beam L37 is incident to the inside of the colored inter-lens portion 35, and the outside light beam L37 is absorbed by the colored inter-lens portion 35. Accordingly, the image contrast is improved in the visual field from the observer side. Thus, the view angle control sheet S3 can obtain the same effect as the view angle control sheet S1 according to the first embodiment. That is, the view angle can be controlled in the cross-sectional direction and the decrease in brightness can be suppressed, so that the high-contrast view angle control sheet can be obtained.

Figure 4:
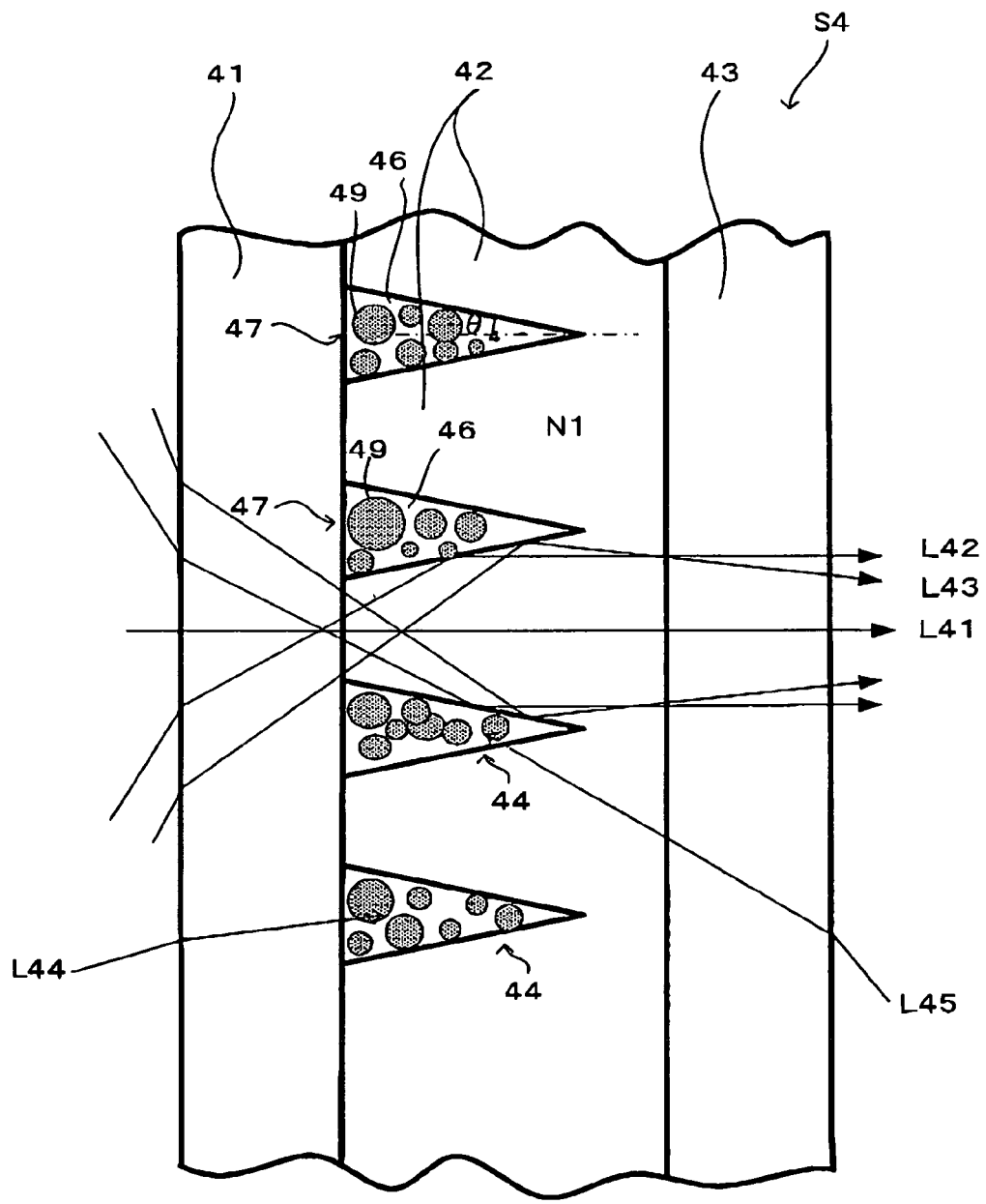
FIG. 4 is a view showing a cross section in a direction of a view angle control sheet according to a fourth embodiment of the invention.

FIG. 4 shows a cross section of a view angle control sheet S4 according to a fourth embodiment of the invention. The view angle control sheet S4 is arranged by gluing a screen image-side base sheet 41, a lens portion 42, and an observer-side base sheet 43 in order from the screen image side to the observer side. The lens portion 42 is made of the material having the high refractive index N1. In FIG. 4, a portion having the triangular shape in cross section sandwiched by the lens portions 42 and 42 vertically adjacent to each other is filled with the material in which light beam absorption particles 49 are added into a transparent material (hereinafter referred to as "transparent low-refractive index material 46") having the refractive index N2 lower than the refractive index N1. Hereinafter the portion filled with the low-refractive index material 46 is referred to as "wedge-shaped portion 44". The wedge-shaped portion 44 has the leading edge on the observer side, and the wedge-shaped portion 44 has a bottom surface 47 on the screen image side.

A ratio of the refractive index N1 of the lens portion 42 to the refractive index N2 of the low-refractive index material 46 is set in the predetermined range in order to secure the optical characteristics of the view angle control sheet S4. An angle formed by the hypotenuse where the wedge-shaped portion 44 and the lens portion 42 are in contact with each other and the normal line V (line parallel to the normal-incidence light beam relative to the view angle control sheet S4) of the outgoing light beam plane is formed at a predetermined angle $\theta_4$.

The lens portion 42 is usually made of the material such as epoxy acrylate having the ionizing radiation-curable property. The material such as urethane acrylate having the ionizing radiation-curable property is usually used as the transparent low-refractive index material 46. Commercially available color resin fine particles can be used as the light beam absorption particles 49. Further, the screen image-side base sheet 41 and the observer-side base sheet 43 are made of the material whose refractive index is substantially similar to the refractive index of the lens portion 42. Similarly to the view angle control sheet S1 according to the first embodiment, in the fourth embodiment, the outside surface of the observer-side base sheet 43 has the function of at least one of AR, AS, and AG on the observer side.

The optical path of the light beam incident to the lens portion 42 of the view angle control sheet S4 will briefly be described with reference to FIG. 4. The optical paths of the light beams L41 to L43 and L44 are schematically shown in FIG. 4. In FIG. 4, the normal light beam L41 incident near the center portion of the lens portion 42 from the screen image light source side goes straight in and passes through the view angle control sheet S4 to reach the observer. The light beam L42 obliquely incident near the end portion of the lens portion 42 from the screen image light source side is totally reflected at the hypotenuse due to the refractive index difference between the lens portion 42 and the transparent low-refractive index material 46, and the light beam L42 is output onto the observer side as the normal light beam. The light beam L43 incident near the end portion of the lens portion 42 from the screen image light source side with the angle larger than that of the light beam L42 is totally reflected at the hypotenuse, and the light beam L43 is output onto the observer side with the small angle close to the normal light beam unlike the incident light beam in the opposite direction to the direction of the incident light beam. The light beam L44 which impinges on the bottom surface 47 of the wedge-shaped portion 44 is incident to the inside of the wedge-shaped portion 44. The light beam L44 is absorbed by the light beam absorption particles 49 and the light beam L44 never reaches the observer side. Furthermore, the outside light beam L45 incident to the hypotenuse from the observer side with the angle larger than the predetermined angle is not totally reflected irrespective of the refractive index difference between the lens portion 42 and the wedge-shaped portion 44, and the outside light beam L45 is incident to the inside of the wedge-shaped portion 44. The outside light beam L45 is absorbed by the light beam absorption particles 49 of the wedge-shaped portion 44. Accordingly, the image contrast is improved in the visual field from the observer side. Thus, since the light incident with various angles from the screen image side is output onto the observer side in the direction of the normal line of the outgoing light beam plane or the direction close to it, the view angle can be controlled and the decrease in brightness can be suppressed, so that the high-contrast view angle control sheet can be obtained.

Figure 5:
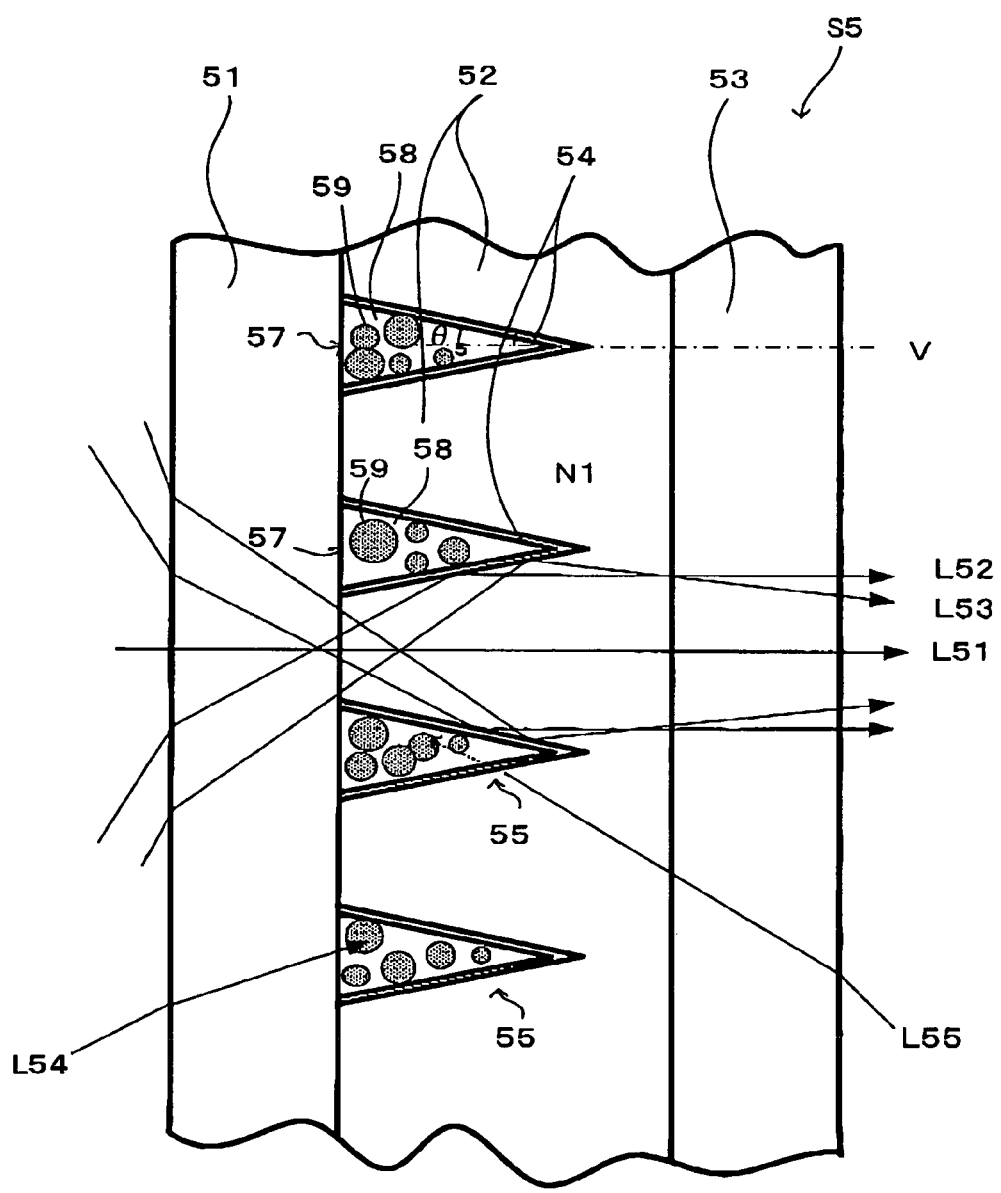
FIG. 5 is a view showing a cross section in a direction of a view angle control sheet according to a fifth embodiment of the invention.

FIG. 5 shows a view angle control sheet S5 according to a fifth embodiment of the invention. The view angle control sheet S5 is arranged by gluing a screen image-side base sheet 51, a lens portion 52, and an observer-side base sheet 53 in order from the screen image side to the observer side. The lens portion 52 is made of the material having the high refractive index N1. In FIG. 5, a layer 54 (hereinafter referred to as "transparent low-refractive index layer 54") is formed in the hypotenuses of the lens portions 52 and 52 vertically adjacent to each other. The transparent low-refractive index layer 54 is made of the transparent material having the refractive index N2 lower than the refractive index N1. Further, a portion having the triangular shape in cross section sandwiched by the hypotenuses of the adjacent lens portions 52 and 52 is filled with the material in which light beam absorption particles 59 are added into a transparent material 58 having the refractive index higher than the refractive index N2. Hereinafter the portion having the triangular shape in cross section is referred to as "inter-lens portion 55".

A ratio of the refractive index N1 of the lens portion 52 to the refractive index N2 of the transparent low-refractive index layer 54 is set in the predetermined range in order to secure the optical characteristics of the view angle control sheet S5. An angle formed by the hypotenuse where the transparent low-refractive index layer 54 and the lens portion 52 are in contact with each other and the normal line V (line parallel to the normal-incidence light beam relative to the view angle control sheet 35) of the outgoing light beam plane is formed at a predetermined angle $\theta_5$.

The lens portion 52 is usually made of the material such as epoxy acrylate having the ionizing radiation-curable property. The transparent low-refractive index layer 54 is made of the material having the refractive index lower than the refractive index of the transparent resin such as silica. The commercially available color resin fine particles can be used as the light beam absorption particles 59. The screen image-side base sheet 51 and the observer-side base sheet 53 are made of the material whose refractive index is substantially similar to the refractive index of the lens portion 52. Similarly to the view angle control sheet S1 according to the first embodiment, in the fifth embodiment, the observer side of the observer-side base sheet 53 has the function of at least one of AR, AS, and AG on the observer side.

The optical path of the light beam incident to the lens portion 52 of the view angle control sheet 55 will briefly be described with reference to FIG. 5. The optical paths of the light beams L51 to L54 are also schematically shown in FIG. 5. In FIG. 5, the normal light beam L51 incident near the center portion of the lens portion 52 from the screen image light source side goes straight in and passes through the view angle control sheet S5 to reach the observer.

The light beam L52 obliquely incident near the end portion of the lens portion 52 from the screen image light source side is totally reflected at the hypotenuse due to the refractive index difference between the lens portion 52 and the transparent low-refractive index material 54, and the light beam L52 is output onto the observer side as the normal light beam. The light beam L53 incident near the end portion of the lens portion 52 from the screen image light source side with the angle larger than that of the light beam L52 is totally reflected at the hypotenuse, and the light beam L53 is output onto the observer side with the small angle close to the normal light beam unlike the incident light beam in the opposite direction of the incident light beam. The light beam L54 incident to the inside of the inter-lens portion 55 from the screen image side is also absorbed by the light beam absorption particles 59 and the light beam L54 is never output to the observer side as the reflection light beam. Further, the outside light beam L55 incident to the hypotenuse from the observer side with the angle larger than the predetermined angle is not totally reflected irrespective of the refractive index difference between the lens portion 52 and the transparent low-refractive index material 54, and the outside light beam L55 is incident to the inter-lens portion 55. The outside light beam L55 is absorbed by the light beam absorption particles 59 of the inter-lens portion 55. Accordingly, the image contrast is improved in the visual field from the observer side. Thus, wide view angle can be obtained and the decrease in brightness can be suppressed, so that the high-contrast view angle control sheet S5 can be obtained.

In the light beam absorption particles 49 and 59 in the view angle control sheets S4 and S5 according to the fourth and fifth embodiments, an average particle size preferably ranges from 1 μm to two-thirds of a width of the bottom surface 47 of the wedge-shaped portion 44 or the bottom surface 57 of the inter-lens portion 55. When the sizes of the light beam absorption particles 49 and 59 are too small, the sufficient light beam absorption effect cannot be obtained. On the other hand, the excessively large sizes of the light beam absorption particles 49 and 59 are undesirable, because the inside of the wedge-shaped portion 44 or the inter-lens portion 55 is hardly filled with the light beam absorption particles 49 or 59 from the bottom surface 47 or 57 during the production. Moreover, the light beam absorption particles 49 and 59 in the view angle control sheets S4 and S5 according to the fourth and fifth embodiments preferably have a 10 to 50% by volume of the whole volume of the wedge-shaped portion 44 or the inter-lens portion 55. Maintaining the above volume ratio enables to keep the sufficient light beam absorption effect and to give simple production process.

Figure 6:
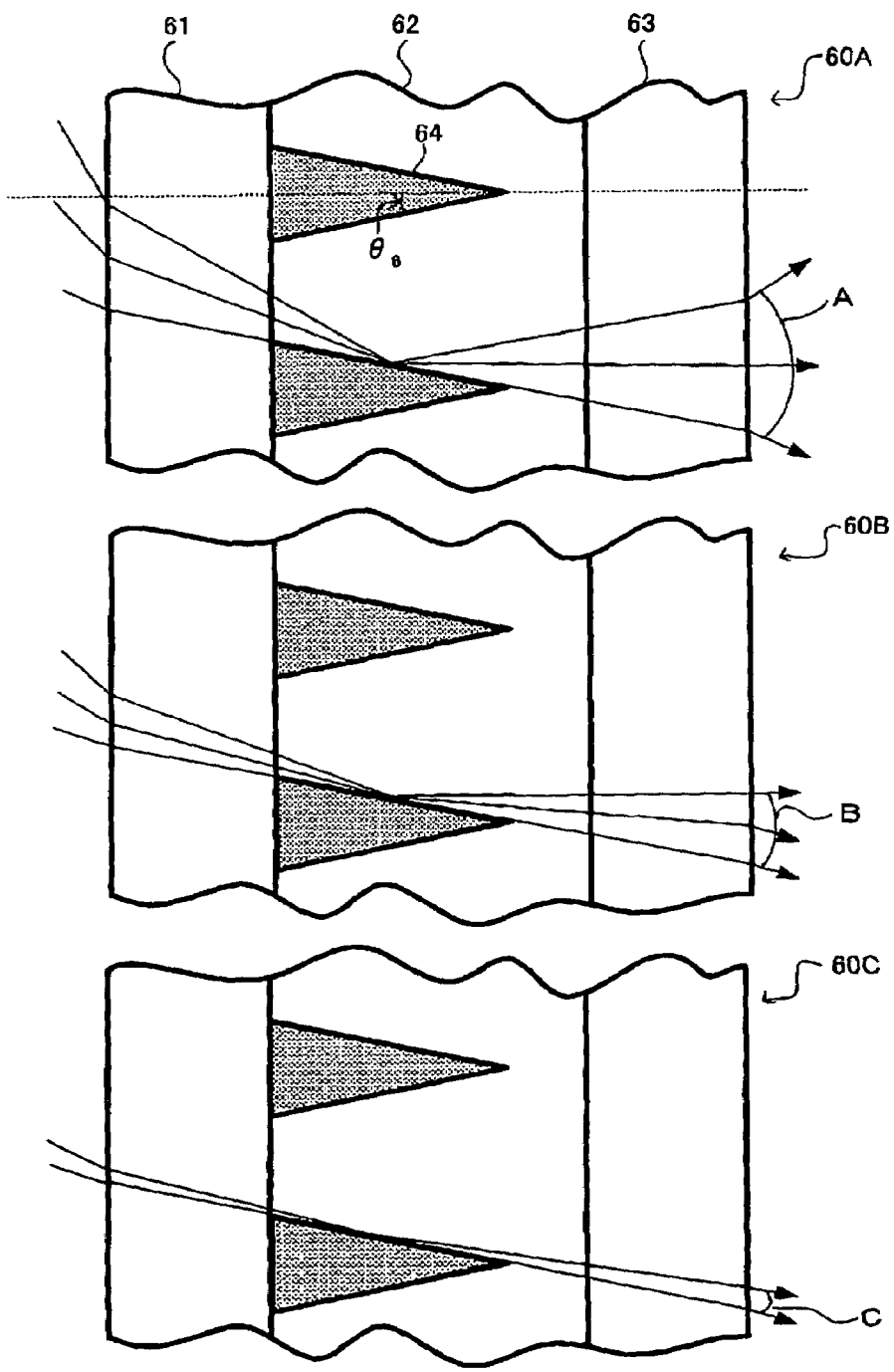
FIG. 6 is a schematic sectional view illustrating a status in which a light beam reflected from a slope of a wedge-shaped portion of the view angle control sheet reaches an observer side.

FIG. 6 is a schematic sectional view illustrating a status in which the light beam reflected at the slope of the wedge-shaped portion of the view angle control sheet reaches the observer side. In view angle control sheets 60A, 60B, and 60C shown in an upper portion, a middle portion, and a lower portion of FIG. 6, the screen image side is set to the left side in FIG. 6 and the observer side is set to the right side. In each sheet, a screen image-side base sheet 61, a lens portion 62, and an observer-side base sheet 63 are arranged in order from the left side of FIG. 6. The wedge-shaped portion 64 is provided in the lens portion 62 while the leading edge (apex) of the wedge-shaped portion 64 is orientated toward the observer side. An angle $\theta_6$ formed by the slope of each wedge-shaped portion 64 and the normal line V of the light beam outgoing plane is formed in the range of 3 to 20 degrees.

The view angle control sheets 60A, 60B, and 60C shown in the upper portion, the middle portion, and the lower portion of FIG. 6 compare three cases, where the ratios of the refractive index N1 of the material constituting the lens portion to the refractive index N2 of the material constituting the slope portion differ from one another, to one another. The view angle control sheet 60A of the upper portion is the case where the value of R=N2/N1 is small, i.e., the case where a level in which the refractive index N1 of the lens portion 62 is larger than the refractive index N2 of the slope portion is larger than the levels of the following view angle control sheets 60B and 60C, and the total reflection is generated in a range A shown in FIG. 6.

The view angle control sheet 60B of the middle portion is the case of R−cos $\theta_6$=0. The view angle control sheet 60B shows a boundary in which the totally reflected light beam reaches the front face, and the total reflection is generated in a range B shown in FIG. 6.

The view angle control sheet 60C of the lower portion is the case where R has the large value. The reflected light beam does not reach the front face, and the total reflection is generated in a range C shown in FIG. 6. In the invention, in consideration of the practical characteristics, the following relationship is preferably satisfied:

−0.01<R−cos $\theta_6$<0.002

When the value of (R−cos $\theta_6$) is not more than −0.01, the number of totally reflected light beams is increased, and the totally reflected light beam is observed in the wide angle. Therefore, particularly when the totally reflected light beam is observed from the oblique direction, the distance between the ghost image and the real screen image is increased, which causes the ghost image to become conspicuous, consequently the ghost image degrades screen image quality.

On the other hand, when the value of (R−cos $\theta_6$) is at least 0.002, the small number of light beams is totally reflected, and the effective screen image light beam hardly reaches the observer. Therefore, the brightness increase effect cannot sufficiently be obtained.

Figure 7:
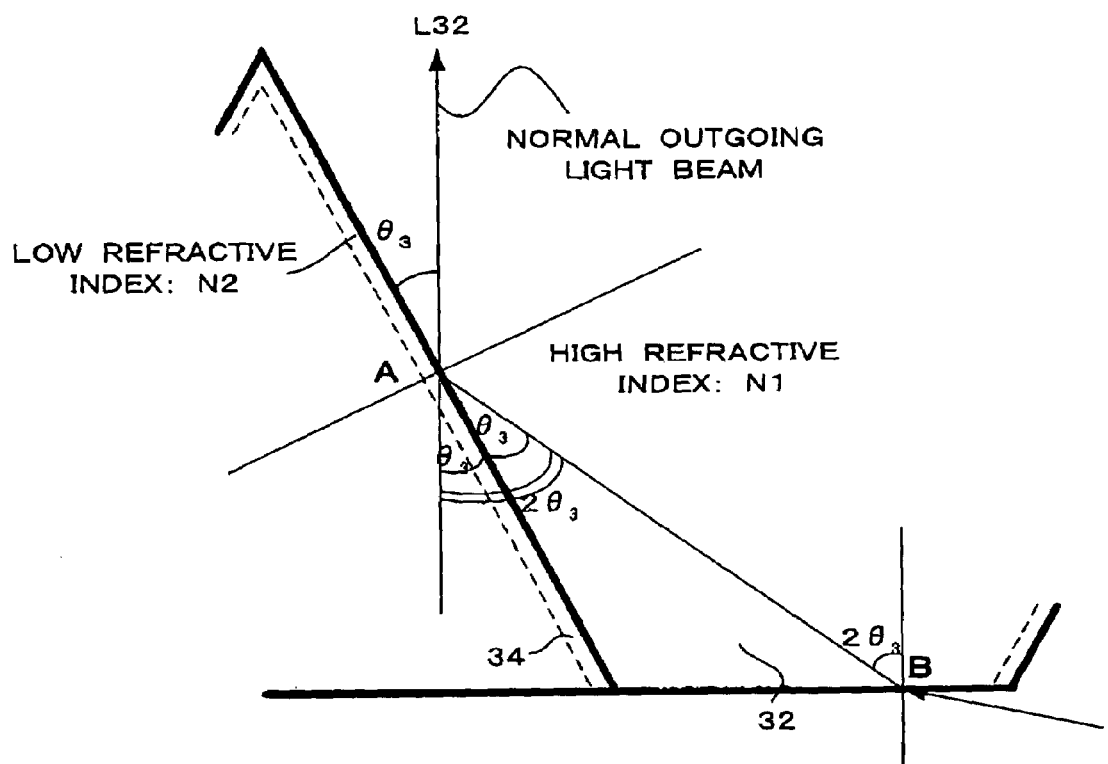
FIG. 7 is a view for examining a condition that the light beam is incident to a lens portion such that the light beam is emitted toward a direction perpendicular to the view angle control sheet.
Figure 8:
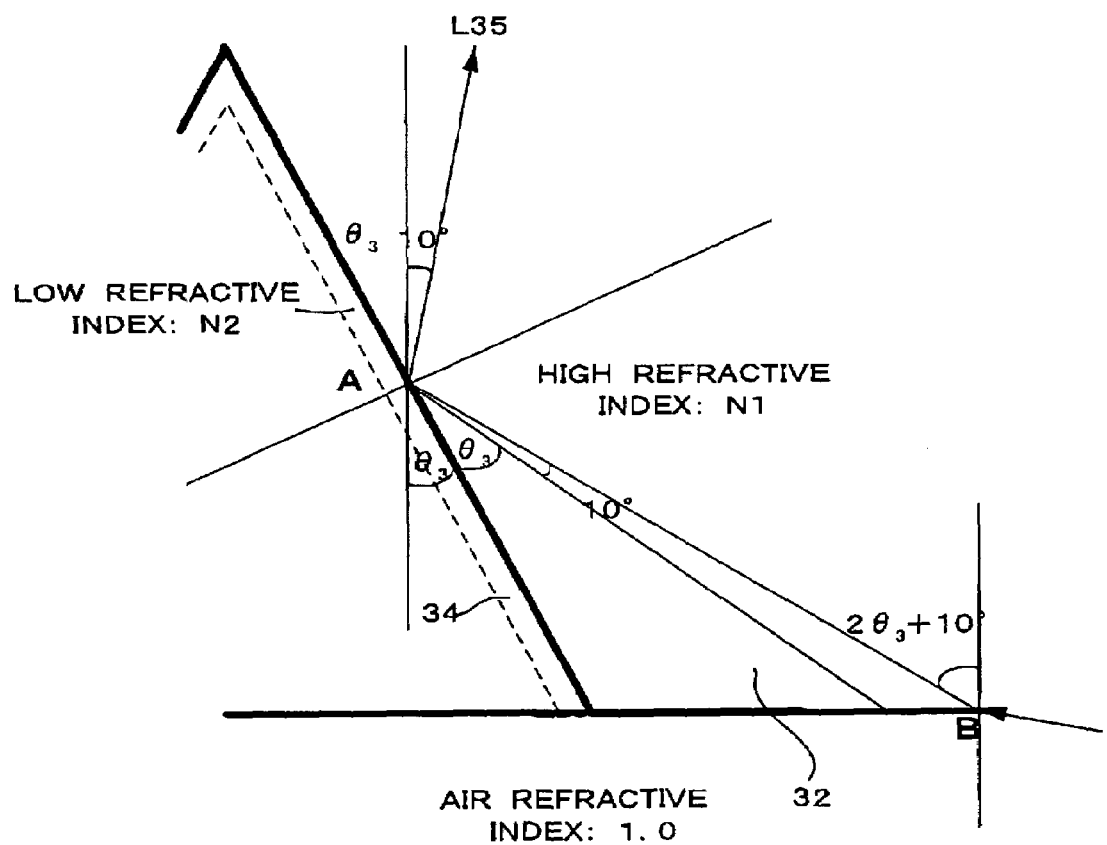
FIG. 8 is a view for examining a condition that the light beam is incident to the lens portion so as to be emitted at a 10° angle with respect to the view angle control sheet.

Then, the condition that all the light beams in the view angle control sheet S3 incident to the unit lens portion 32 of the view angle control sheet S3 according to the third embodiment are totally reflected by the hypotenuse will be studied with reference to FIG. 7 and FIG. 8.

As the incident angle from the screen image side into the sheet is brought close to 90 degrees, the total reflection hardly occurs at the hypotenuse of the view angle control sheet S3. Therefore, when the condition that the light beam is totally reflected at the smaller angle is determined, i.e., when the condition that the light beam which is incident into the sheet is totally reflected by the hypotenuse in extremely parallel with the screen image-side light beam incident plane, other incident light beams are totally reflected by the hypotenuse.

FIG. 7 is a view showing the optical path when the light beam L32 reflected at the hypotenuse of the view angle control sheet S3 is output at right angle to the outgoing plane in the view angle control sheet 3. In FIG. 7, it is assumed that the screen image light source is positioned in the lower portion and the observer is positioned in the upper portion. The screen image-side base sheet 31 and the observer-side base sheet 33 are omitted for the sake of the simple description (the same to FIG. 8).

In FIG. 7, the condition (critical condition) that the total reflection of the light beam L32 incident to the hypotenuse is started at a point A of the hypotenuse is given as follows by Snell's law:

$\sin(90°−\theta_3)=N2/N1$.

Therefore, in order to always generate the total reflection of the normal light beam L32, it is necessary to satisfy the following condition represented by expression 1:

$\sin(90°−\theta_3)\geq N2/N1$ (Expression 1)

At this point, because the value of $\sin(90°−\theta_3)$ is always smaller than 1.0, the expression 1 becomes substantially N2≦N1.

Assuming that the refractive index of atmosphere is 1, the condition (critical condition) that the light beam L32 totally reflected at the point A of the hypotenuse is the light beam which is incident into the sheet at a point B of the light beam incident plane in extremely parallel with the screen image-side light beam incident plane is given as follows by the Snell's law:

$\sin 2\theta_3 = 1/N1$.

Therefore, all the light beams incident into the sheet from the point B satisfy the following condition represented by expression 2:

$\sin 2\theta_3 < 1/N1$. (Expression 2)

That is, the expression 1 and the expression 2 become the condition that all the light beams in the view angle control sheet S3 incident to the unit lens portion 32 of the view angle control sheet S3 are totally reflected by the hypotenuse.

The optical path of the light beam L35 which forms the inclination of 10° relative to the outgoing light beam plane normal line by impinging on the lens portion of the view angle control sheet S3 to be reflected from the hypotenuse will briefly be described below with reference to FIG. 8 for the purpose of reference.

In FIG. 8, the condition (critical condition) that the total reflection of the light beam L35 incident to the hypotenuse in the view angle control sheet S3 is started at the point A of the hypotenuse is given as follows by the Snell's law:

$\sin(80°−\theta_3)=N2/N1$.

Therefore, in order to always generate the total reflection of the normal light beam L35, it is necessary to satisfy the following condition represented by expression 3:

$\sin(80°−\theta_3)>N2/N1$. (Expression 3)

Assuming that the refractive index of atmosphere is 1, the condition (critical condition) that the light beam is the light beam which is incident into the sheet at a point B of the light beam incident plane in extremely parallel with the screen image-side light beam incident plane is given as follows by the Snell's law:

$\sin(2\theta_3+10°)=1/N1$.

Therefore, the light beams incident into the sheet from the point B is always given as follows:

$$\sin(2\theta_3+10°)<1/N1.$$

That is, the light beams incident into the sheet from the point B always satisfies the following condition represented by expression 4:

$$N1<1/\sin(2\theta_3+10°). \quad \text{(Expression 4)}$$

Assuming that the angle $\theta_3$ is set in the range of 5° to 20° which is preferable in consideration of production conditions and the like, the value of N1 and N2 will specifically be studied in the angle $\theta_3$ ranging from 5° to 20°. In the ranging of $5°<\theta_3<20°$, the following relationship is held:

$$0.940<\sin(90°-\theta_3)<0.996.$$

Therefore, as can be seen from the expression 1, the value of N2/N1 is smaller than 0.940, so that the following expression 5 is obtained:

$$N2/N1<0.940. \quad \text{(Expression 5)}$$

In the ranging of $5°<\theta_3<20°$, the following relationship is held:

$$1.56<1/\sin 2\theta_3<5.76.$$

Therefore, as can be seen from the expression 2, the following expression 6 is obtained:

$$N1<1.56. \quad \text{(Expression 6)}$$

When the actually available material is considered, the minimum value of N2 is 1.30, so that the following relationship is held:

$$N2/N1>1.30/1.56=0.83.$$

Accordingly, the following expression 7 is given from the above relationship and the expression 6:

$$0.83<N2/N1<0.940. \quad \text{(Expression 7)}$$

The value of N2/N1 can be set in the range represented by the expression 6 and the expression 7, in order that all the light beams incident into the sheet from the screen image side in the range of $5°<\theta_3<20°$ are totally reflected by the hypotenuse. In the invention, the range of N2/N1 is defined as follows from the viewpoints of the sheet production conditions and the actual characteristics:

$$0.80<N2/N1<0.98.$$

FIG. 9 is a view showing various shape modes of the low-refractive index portion. The low-refractive index portion has the substantially triangular shape formed by the hypotenuses of the two adjacent unit lenses 2 and 2. FIG. 9A shows the case where the hypotenuse is formed by a straight line. In this case, an angle $\theta_{11}$ formed by the hypotenuse and the outgoing light beam plane normal line is kept constant at any point on the hypotenuse. FIG. 9B shows the case where the hypotenuse is formed by a smoothly curved line. FIG. 9C shows the case where the hypotenuse is formed by the two straight lines. In these cases, angles $\theta_{12}$, $\theta_{13}$, and $\theta_{14}$ formed by the hypotenuses and the outgoing light beam plane normal lines depend on the position on the hypotenuse. In the invention, when the angle formed by the hypotenuse and the outgoing light beam plane normal line is not constant as shown in FIGS. 9B and 9C, the effect of the invention can be obtained by satisfying the conditions of the above-described expressions 1 to 7 in the range at least a 90% length of the hypotenuse.

FIG. 10 shows the cross section of a view angle control sheet 70 in which the slope shape of the wedge-shaped portion exhibits another mode. The cross-sectional shape of a wedge-shaped portion 74 has an acute-angled triangle whose apex is orientated toward the observer side. An angle formed by an upper-side slop of the acute-angled triangle and an outgoing light beam plane normal line V1 is zero degree. On the other hand, an angle $\theta_7$ formed by a lower-side slope of the acute-angled triangle and an outgoing light beam plane normal line V2 is about 10 degrees. As shown in FIG. 10, when the lower-side slope is larger than the upper-side slope in the angle relative to the outgoing light beam plane normal line, the display device is formed by a crosswise stripe in which the wedge-shaped portions are horizontally arranged (see FIG. 11). Therefore, since the display device is usually seen from slightly upper side, the transmittance is high for the light beam going upward from the screen image source, and the brightness can be further improved on the observer side.

FIGS. 11 to 13 are a view showing an example of the configuration of the view angle control sheet according to the invention. A view angle control sheet S9 shown in FIG. 11 includes a unit lens 92 whose vertically cross-sectional shape is constant in the horizontal direction. A base sheet 91 is arranged on the screen image side and a base sheet 93 is arranged on the observer side. In FIG. 11, although the three components are shown while separated from one another for the purpose of understanding, actually the components are bonded to one another.

A view angle control sheet S10 shown in FIG. 12 includes a unit lens 102 whose horizontally cross-sectional shape is constant in the vertical direction. A base sheet 10 is arranged on the screen image side and a base sheet 103 is arranged on the observer side.

In a view angle control sheet S11 shown in FIG. 13, unit lenses having circular truncated conical shapes are two-dimensionally arrayed on the vertical plane. Top surfaces of the circular truncated conical unit lenses are formed in the same plane, and a base sheet 111 is bonded to the plane. A cavity between the base sheet 111 and the unit lens 112 is filled with the low-refractive index material to form a low-refractive index portion 144. The effect of the invention can be obtained by any one of the configurations of the view angle control sheets S9, S10, and S11 shown in FIGS. 11 to 13.

FIG. 14 shows a configuration of a display device 120 provided with the view angle control sheet according to the invention. In FIG. 14, the screen image side is set in a front left lower direction and the observer side is set in a back-side right upper direction. The display device 120 of the invention includes a liquid crystal display panel 121, a view angle control sheet 122 in which the lens portions are vertically arranged, a view angle control sheet 123 in which the lens portions are horizontally arranged, a Fresnel lens 124, and a functional sheet 125 having at least one of the functions AR, AS, and AG in order from the screen image side. The arrangement between the view angle control sheet 122 and the view angle control sheet 123 may be arranged. In FIG. 14, although the components are shown while separated from one another for the purpose of understanding, actually the components are in contact with one another or the components are bonded to one another.

In the display device 120 of the invention, the width of the edge-shaped portion bottom surface in the view angle control sheet is preferably not more than 1/1.15 of the size of one pixel of the display device 120. The generation of a moire pattern can be suppressed by keeping the above ratio. Further, in the invention, "view angle control sheet" mainly means the configuration on a combination of the view angle control sheet 122 and the view angle control sheet 123. However, when the Fresnel lens 124 and the functional sheet 125 are arranged on the outgoing light beam side as shown in FIG. 14, the "view angle control sheet" shall be a concept including the Fresnel lens 124 and the functional sheet 125.

Example 1

The view angle control sheet having the wedge-shaped portion shown in FIG. 9C was produced with the following specifications. The view angle was able to be controlled at 15°.

aperture ratio: 50% (in this case, "aperture ratio" means a ratio of an area of light transmission portion (lens portion) to the whole area in the light beam incident plane)

$\theta_{13}=8°$
$\theta_{14}=12°$ inter-lens pitch: 0.05 mm
lens portion material (resin) refractive index: 1.56
wedge-shaped portion material refractive index: 1.48

Thus, the invention is described with reference to the embodiments which are considered to be currently most practical and preferable. However, the invention is not limited to the embodiments disclosed in the description, but the various modifications could be made without departing from the summary or thought of the invention which can be read from claims of the invention and the whole description. Therefore, it is understood that the modified view angle control sheet is also included in the technical scope of the invention.

The invention claimed is:

1. A display device having a view angle control sheet being bonded to a liquid crystal display panel, wherein the view angle control sheet comprises lens portions having trapezoidal shapes in cross section arranged at predetermined intervals, a wedge-shaped portion between the lens portions adjacent to each other is filled with the same material as that of the lens portions or with a material different from the lens portions, a base sheet on the liquid crystal display panel side of the lens portions and the wedge-shaped portion, wherein a light from the liquid crystal display panel side is the light with various angles, the wedge-shaped portion has a bottom surface on the liquid crystal display panel side while having a leading edge on an observer side with an outside light beam absorption effect, and the following relationship is held at least between a refractive index (N2) of a material constituting a slope portion of the wedge-shaped portion and a refractive index (N1) of a material constituting the lens portions:

$N2 \geq N1$ and when a ratio of the refractive indexes (N1) and (N2) is N2/N1=R, the following relationship is held further in the angle ($\theta$) (degree) formed by the slope portion of the wedge-shaped portion and a normal line of the light beam outgoing plane:

$-0.01 < R - \cos\theta < 0.002$, and $3 \leq \theta \leq 20$.

2. A display device according to claim 1, wherein the following relationship is held further between the refractive indexes (N1) and (N2):

$0.8N1 \leq N2 \leq 0.98N1$.

3. A display device according to claim 1, wherein a cross-sectional shape of the wedge-shaped portion is a substantial isosceles triangle.

4. A display device according to claim 1, wherein one of angles formed by two slopes of the wedge-shaped portion and the normal line of the light beam outgoing plane is larger that the other.

5. A display device according to claim 1, wherein the slope portion of the view angle control sheet has a curved cross-sectional shape or a polygonal-line cross-sectional shape such that the liquid crystal display panel side differs from the observer side in an angle formed by the slope portion and an observer side surface.

6. A display device according to claim 1, wherein light beam absorption particles are added to the wedge-shaped portion.

7. A display device according to claim 6, wherein an average particle size of the light beam absorption particles is at least 1 μm and the average particle size is not more that two-thirds of a width of the bottom surface.

8. A display device according to claim 6, wherein an addition amount of the light beam absorption particle ranges from 10 to 50% by volume.

9. A display device according to claim 1, wherein a function of any one of anti-reflection (AR), anti-static (AS), anti-glaring (AG), and a touch sensor or a plurality of functions thereof are imparted to at least one surface side.

10. A display device according to claim 1, wherein the view angle control sheet is arranged in a crosswise stripe.

11. A display device according to claim 1, wherein one view angle control sheet is laminated on the observer side of the liquid crystal display panel or two view angle control sheets are laminated the observer side of the liquid crystal display panel while being substantially orthogonal to each other.

12. A display device according to claim 11, wherein the width of the bottom surface is not more that 1/1.5 of a size of one pixel.

* * * * *